INVENTOR
GÜNTHER JOBST
BY
ATTORNEY

Patented Apr. 14, 1931

1,800,536

UNITED STATES PATENT OFFICE

GÜNTHER JOBST, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

TRANSMISSION CIRCUIT

Application filed February 22, 1927, Serial No. 170,069, and in Germany February 23, 1926. Renewed May 11, 1929.

This invention relates to an arrangement for transmitter tubes for high frequency intelligence transmission, especially for what is known as grid direct current telephony. This method of telephony, as is well known, is based upon the fact that in a circuit which connects the grid and the filament in a thermionic tube and through which the grid direct current flows, there is connected a variable resistance (key, modulator tube, and the like). By the variation of this resistance, for instance, at the frequency of the speech to be transmitted, there are occasioned potential variations at the grid which, in turn, serve to control the current in the plate circuit.

The practical operation of this method, as will be seen, is predicated upon the presence of a grid direct current, and sufficient grid direct current as a general rule, is available in every thermionic tube comprising three electrodes under normal service conditions, unless an unduly large delivery or emission of secondary electrons by the grid is brought about. In such a case it may happen that the grid direct current becomes unduly small or is caused to disappear entirely. In practice, this case is apt to arise easily with short-wave transmitters. As a consequence, telephonic operation in a grid direct current circuit arrangement becomes impossible.

According to the present invention, by certain circuit means, failure of the grid direct current is prevented from happening, and a convenient regulation of the grid direct current is obtained.

In the accompanying drawing

Figure 1:
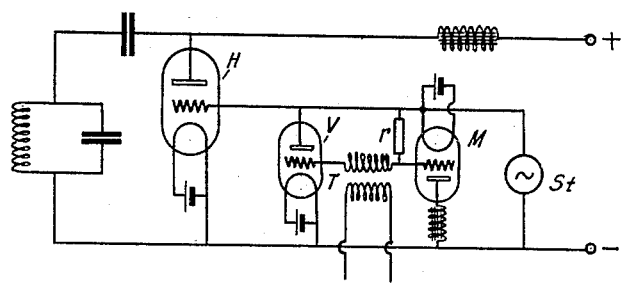
Figure 2:
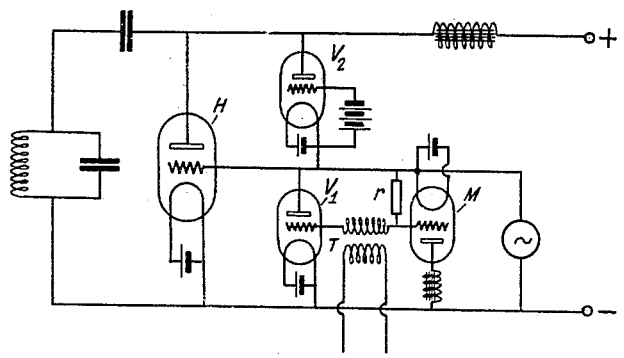

Figure 1 is a wiring diagram showing one form of my invention preventing grid direct current disappearance and, Figure 2 is a modification thereof.

By the arrangement of a valve tube inserted between grid and filament or between plate and grid of the tube to be controlled, it is possible to control the value of the direct current flowing across the variable resistance (modulator tube). The tube valve most suitably consists of a three-electrode tube. In case an increase in the direct current which flows through the modulator tube is necessary the valve tube is connected in such a manner that the filament is united with the filament of the tube to be controlled, and the plate of the valve tube with the grid of the main tube, with the result that an additional electron source for the direct current in the grid circuit is created.

The operation of such a circuit arrangement is further explained by Figure 1. In this figure is indicated the main tube H in this case an amplifier which is subject to separate control by a control tube St. In the grid circuit of the tube is the modulator tube M. An additional valve tube V, i. e., a thermionic tube also comprising three electrodes, is inserted in a manner as before described. Now, the action of the said valve tube resides in that, when an interruption of the electronic current due to unduly strong electron emission in the outer grid circuit of the main tube H is caused, a thermionic current is produced by the valve tube which is caused to flow through the modulator tube. In order that the output of this supplementary electron source may be varied, a variable potential, as shown in Figure 1 is applied to the grid of this tube by way of transformer T which is used at the same time for supplying the speech oscillations at the modulator tube M. If desired, the tube in question could be also given a constant bias. The circuit arrangement as shown comprises also a direct current resistance $r$ connected in parallel to the grid-cathode space of the modulator tube.

Under certain circumstances it may be necessary to provide a second valve tube whose filament is united with the grid of the main tube and whose plate is connected with the plate of the main tube. By the aid of this tube, a reduction of the current flowing through the modulator tube can be obtained, and this may be necessary under certain circumstances. In the arrangement illustrated in Figure 2, the said second valve tube is designated by V2. The grid of this second valve tube is furnished with a constant bias as shown in the drawing. If this bias is made variable in dependence, similarly as the potential of the grid of valve tube V1, upon the speech currents, additional regulation of the current flowing through modulator tube M can be attained.

When the secondary electron emission of the main tube H is too strong, the valve tube V1 comes into action and supplies the current required by the modulator tube. But if the current in the grid circuit is too large a part thereof may be consumed by the valve tube V2, so that it is possible to adjust and regulate at will the direct current conditions in the modulator tube M.

In the circuit arrangements here illustrated, the so-called valve tubes are of the triode type, although it will be understood that also two-electrode tubes could be used. It will also be evident that the present invention is useful in connection with other circuit arrangements than the one here chosen by way of example.

The manner in which, by the systems described above, radio frequency oscillations are modulated may be further explained as follows. Vacuum tube H is used for the purpose, as shown in Fig. 1, of amplifying radio frequency oscillations applied to its input by a source such as an alternator or a vacuum tube oscillator indicated diagrammatically by St. In the output circuit of tube H there is a tuned circuit corresponding to the frequency of the input oscillations.

To modulate the oscillations which are to be amplified by tube H, use is made of the direct current flowing in the grid circuit of tube H. Assuming that a constant current is made to flow in the grid circuit of tube H through modulator M, which may be considered a high resistance, by varying the resistance, that is, by varying the effective resistance of modulator M the voltage drop across modulator M will be varied, thereby varying the bias on the grid of tube H. This in turn, will vary the amplification of radio frequency currents applied to the input of tube H.

Variation of the effective resistance of modulator M is accomplished by varying the input to modulator M at an audio frequency. Input variations vary the voltage drop across the output terminals of modulator M and will therefore vary the bias on the grid of tube H and hence modulate the radio frequency output of tube H at an audio frequency corresponding to the audio frequency input to modulator tube M.

It is thus seen that the modulation depends upon the flow of a relatively constant current in the grid circuit of tube H. There are times, however, when the grid of tube H is of such a potential that a single electron emitted from the filament of tube H will strike the grid at such a velocity that a plurality of electrons are knocked off the grid. Hence it is apparent that there will be a time when there will be no current or a materially decreased current flowing in the grid circuit of tube H such that variations in the effective resistance of tube M by means of varying its input does not produce the desired voltage drops across modulator tube M as there will be no grid current flowing through M. Hence the modulation becomes illusory, in fact, if there is no current flowing in the grid circuit of tube H no modulation whatsoever will result.

At such a time tube V of Fig. 1 comes into play and supplies the deficiency in current through modulator tube M maintaining the current constant so that by varying the effective resistance of tube M desired variations in bias of the grid of tube H is obtained. In other words, the choke in the output circuit of tube M, and tube V, maintain a substantially constant flow of current through modulator M acting as a variable high resistance. Tube V of course comes into action only when there is no, or a greatly diminished, flow of electrons in the grid circuit of tube H.

Just as it is possible to have too small a flow of electrons in the grid circuit of tube H it is also possible that the grid of tube H may be given at times such a bias that the current flowing in the grid circuit of tube H becomes unduly large. Tube M would of necessity have to handle this unduly large current and under such circumstances it is apparent that modulation by the variation of the input electro-motive force of tube M would again become illusory, that is, input voltage variations to the tube M would not produce the desired voltage drops across the output of tube M.

To provide for such a state of conditions applicant has provided, as shown by him in Fig. 2, an additional tube V2 connected across the control electrode and anode of amplifier tube H. Tube V2 serves then to relieve an excess flow of electrons in the grid circuit of H, tube V1 serves to supply electrons when deficiencies in the grid circuit of tube H occur, and all this, with the action of the choke coil in the plate circuit of modulator M tends to keep the current through modulator M very constant. Accordingly, it should be clear that with a constant current through M and by varying the resistance through which that current flows, in this case modulator M, excellent modulation of the output of the radio frequency amplifier tube H is obtained.

Having thus described my invention what I claim is:

1. In radio signalling apparatus, a thermionic amplifier; a tuned circuit connected to its output electrodes; a modulator tube having its output electrodes connected to the input electrodes of said amplifier; means for applying radio frequency oscillations to the input of said amplifier; and another tube connected to said amplifier between said amplifier and said modulator, having its anode connected to the control electrode of said amplifier, and its cathode to the cathode of said amplifier, for supplying deficiencies in the grid current of said amplifier.

2. In radio signalling apparatus a thermionic amplifier; a tuned circuit connected to its output electrodes; a modulator tube having its output electrodes connected to the input electrodes of said amplifier; means for applying radio frequency oscillations to the input of said amplifier; and a triode, connected between said amplifier and said modulator having its anode connected to the control electrode of said amplifier, its cathode connected to the cathode of said amplifier, and having its control electrode connected to the control electrode of said modulator, for supplying deficiencies in the grid current of said amplifier.

3. In radio signalling apparatus a thermionic amplifier; a tuned circuit connected to its output electrodes; a modulator tube having its output electrodes connected to the input electrodes of said amplifier; means for applying a radio frequency current to the input of said amplifier; and a triode, between said amplifier and said modulator having its anode connected to the control electrode of said amplifier, its cathode to the cathode of said amplifier and having its control electrode connected to the control electrode of said modulator, for supplying deficiencies in the grid current of said amplifier; and means for applying to the control electrodes of the modulator and said triode a modulating electro-motive force.

4. In a radio signalling system, an amplifier having a tuned circuit connected to its output terminals; means for applying to the input terminals of said amplifier radio frequency oscillations, a modulator tube connected across the input of said amplifier; an electron discharge device connected ahead of said modulator to the input of said amplifier, the anode and cathode of said device being connected to the control electrode and cathode respectively of said amplifier; and another electron discharge device connected to said amplifier, the anode and cathode of said last mentioned device being connected to the anode and control electrode respectively, of said amplifier.

5. In a radio signalling apparatus, a thermionic amplifier, a modulator tube having its output electrodes connected to the input electrodes of said amplifier, means for applying radio frequency oscillations to the input of said amplifier, and another tube connected to said amplifier, across said amplifier and said modulator, for supplying deficiencies in the grid current of said amplifier.

6. In a radio signalling apparatus, a thermionic amplifier, a modulator tube connected to the amplifier, means for applying radio frequency oscillations to the input of said amplifier, and a tube connected to said amplifier and modulator tube and having its anode connected to the control electrode of said amplifier and its cathode to the cathode of said amplifier, for supplying deficiencies in the grid current of said amplifier.

7. In a radio signalling apparatus, a thermionic amplifier, a modulator tube having its output electrodes connected to its input electrodes of said amplifier, a source of radio frequency oscillations connected to said modulator tube, and an electron discharge device connected to said amplifier, across said amplifier and said modulator, for supplying deficiencies in the grid current of said amplifier.

GÜNTHER JOBST.